Figure 1:
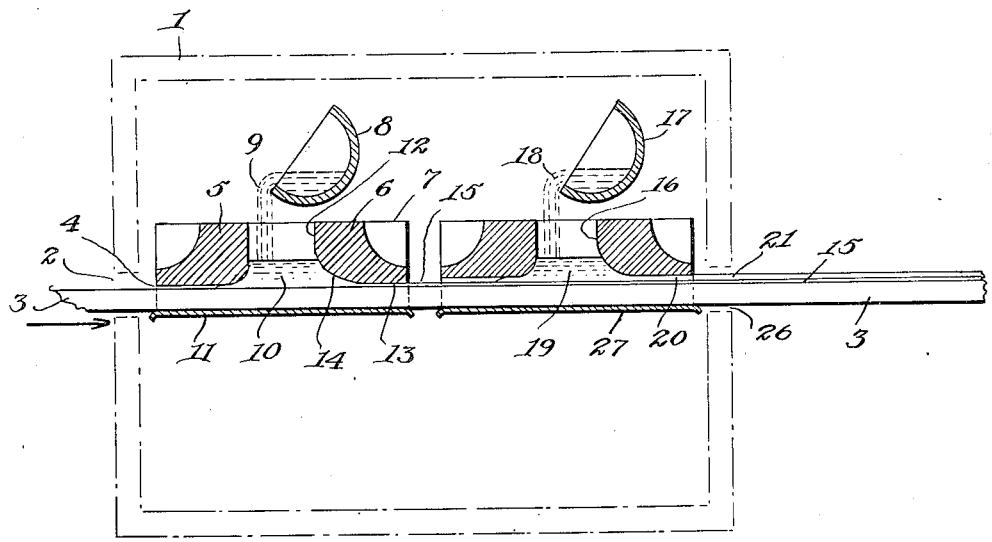

April 24, 1934.  J. V. O. PALM  1,956,467

BEARING MANUFACTURE

Original Filed Oct. 1, 1930

Inventor
John V. O. Palm
By Foy Oberlin & Fay
Attorneys

Patented Apr. 24, 1934

1,956,467

UNITED STATES PATENT OFFICE 1,956,467

BEARING MANUFACTURE

John V. O. Palm, Cleveland Heights, Ohio, assignor to The Cleveland Graphite Bronze Company, Cleveland, Ohio, a corporation of Ohio Application October 1, 1930, Serial No. 485,696
Renewed January 4, 1934

4 Claims. (Cl. 29—149.5)

This invention, relating, as indicated, to bearing manufacture is more particularly directed to a novel method of producing journal bearings, as distinguished from ball and roller bearings.

Ordinarily, the housings which receive bearings are castings and the bearing material which may be babbitt is poured against the housing, this process being quite costly because of the fact that the babbitt must be of considerable thickness, due to the irregularity of the casts housing surface, and also because the housings are sometimes of relatively large proportions, and placing them in a position to line with babbitt is an expensive and awkward process. The thick layer of babbitt in such bearings of the prior art is also objectionable because babbitt is soft and a thick layer is subject to distortion from radial pressure more easily than a thin lining of babbitt backed with hard material.

A second well known method, which has supplanted to a large extent the above mentioned pouring method, in the bearing industry is to line a thick layer of brass with babbitt, but the resulting bearing is very expensive because of the cost of the brass. It has been found that steel may be lined with babbitt or bronze, and that the thickness of the steel as compared with that of the brass may be materially reduced. The resulting bearing is very cheap to produce as far as the materials are concerned, but the problem is how to unite these two metals, which have such different properties, so that the cost of such union plus the cost of materials is less than the total cost of a lined housing or a lined brass backed bearing. I have found that either bronze, or babbitt, or other suitable bearing material in the form of strips may be united to steel, and that this thickness of the babbitt or equivalent bearing material may be materially reduced and yet such a bearing will outlast a thick, cast bearing, and in the event of replacement the cost is only a fraction of what it would be under former conditions.

A further and important objection to replacing worn out bearings by casting is that the process of casting, being carried out in small shops under all sorts of conditions, produces a bearing lining the structure of which is far from uniform as compared to a lining produced in the factory under controlled conditions, where the bearing has a structure of just the desired character. This will be appreciated by taking the main bearing of an automobile, for example, which is usually cast in the block. If this bearing becomes worn the block has to be taken out, all the old babbit removed, and then the bearing housing is cast with babbitt. With the use of my improved thin wall bearings all of this labor is avoided and the cost of material is less, since part of the space which was formerly occupied by babbitt, a very expensive material, is now taken up by steel. The reference to the use of my bearing in an automobile is only intended as a means of illustration and I do not wish to be limited to the use of my improved bearing in automobiles.

In this particular instance, I have aimed to provide a method of forming bearings which does not involve either die casting or centrifugal casting, the bonding metal and bearing metal being poured on in such a manner that a composite strip results.

The invention in this case also involves the omission of any auxiliary pressing means to force the metals of a composite bearing strip together. As is probably well known the three common methods in use today in the manufacture of bearings are die casting, centrifugal casting, and pressing, in some manner, the layers of different metals together to form one composite strip of bearing material. All of these operations necessitate extra machinery as well as labor and add to the cost of the finished bearing. I have found that it is possible to bond babbitt to steel with an intermediate layer of tin without invoking any of the three above stated well known principles. The invention also contemplates the prevention of any oxidation of the surface of the metals which are to receive a superposed layer, and as an extra precaution against oxidation I have evolved a method whereby the pouring of the tin is almost simultaneous with the pouring of babbitt so that oxidation of the tin is practically impossible. It will be noted that I have used the terms "steel", "babbitt" and "tin", but obviously any one well skilled in the art could substitute other metals of the same qualities and obtain the same results, one example of such a substitution being the use of bronze for babbitt, or perhaps the use of solder for tin, etc.

The annexed drawing and the following description set forth in detail one method and certain mechanism embodying the invention, such disclosed method and means constituting, however, but one of various mechanical forms in which the principle of the invention may be used.

In said annexed drawing:—

Figure 2:
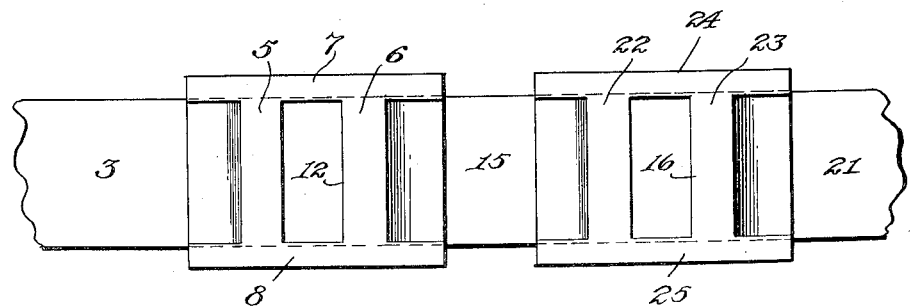

Fig. 1 is a vertical section with parts in elevation; and Fig. 2 is a top plan view taken inside the chamber shown in Fig. 1.

Referring now to Fig. 1, a strip 3 is illustrated, which may be steel and will be referred to as such, entering a heat chamber 1 through the opening 2. Within the heat chamber 1 two pouring gates are illustrated, one of which is shown adjacent the opening 2, but such positioning need not be followed in every case as the distance between this pouring gate and the opening 2 depends upon the degree of heat which it is desired to impart to the strip 3 before coating it with tin. The first pouring gate, which I shall term the tin pouring gate, comprises a base or support 11 from which vertical walls 7 and 8 rise, the last named walls having transverse partitions 5 and 6 therebetween so that three openings are formed in the pouring gate, two of which are an entrance 4 and an exit 3, said exit having a vertical dimension slightly greater than said entrance. Mid-way between said exit and entrance a vertical opening comprising a throat portion 12 is shown, said throat portion becoming larger in a downward direction, the increase in size being toward the exit. Immediately above the throat 12, a ladle 8 is shown from which a charge of molten tin 9 will be seen to descend and form a surplus shown at 10. The throat 12 as it descends gradually merges into the exit 13 forming a curved surface 14 in order that the molten tin will be packed against the steel by means of the movement of the steel strip. Although the partition 6 and its attendant function as a sizing opening as shown at 13 is illustrated as being fixed in place it will readily be appreciated that this partition may be made adjustable. For instance, the partition may be fixed to a transverse horizontal shaft and said shaft may be received in vertical slots in the vertical sides 7 and 8, the shaft having thumb screws upon its ends to fix the partition in any desired place. The same may be true of the other partition 5, but ordinarily the exact position of this partition is immaterial as it merely serves as a means of preventing the molten tin 10 from spreading in a forward direction. After the strip 3 passes through the first pouring gate a layer of tin will be formed on its upper surface as shown at 15. The strip now enters a second pouring gate and the process is repeated with a different metal which may be babbitt. The babbitt is held in a ladle 17 and descends as shown at 18 to form a surplus as shown at 19, the weight of which forces the strip 3 and its layer of tin downwardly against the support 27.

Similar to the construction of the tin pouring gate a throat 16 is provided which merges into a sizing opening 20 which operates to form a uniform compact layer of bearing metal at 21. It is not thought necessary to describe the babbitt pouring gate in as exact detail as the tin pouring gate, it being of substantially the same structure and consisting of two vertical walls 24 and 25 having partitions 22 and 23 therebetween, the whole of which is supported upon the base 27. In each instance, the ends of the bases 11 and 27 are curved downwardly so that easy travel of the strip is afforded. The strip 3 with its two superposed layers 15 and 21 is now fed out of the heat chamber through the opening 26 and is ready to be blanked and formed into bearings.

The manufacture of bearings according to my improved method is as follows:—

A strip of steel or other bearing backing material 3 is lead into a heat chamber where, after being heated to the desired degree, it receives a layer of tin. The process is a continuous one and the reception of such tin is brought about by my novel means of providing a compact layer of said tin. As the strip passes under a vertical opening containing a surplus of molten tin it moves said tin against a gradually restricted opening which presses the tin downwardly and forms a layer of the desired size or thickness. After the strip 3 receives a coating 15 of tin it is immediately operated upon in the same manner to produce a layer of bearing lining material, such as babbitt, the last named layer being compacted and sized in the same manner as the tin. Both of the operations just mentioned take place within a heat chamber, the atmosphere of which is maintained free from oxygen, thus guarding against one of the greatest dangers encountered in bonding metals together. After the composite strip has been formed it is led out of the heat chamber, blanked to the desired size and then formed into either whole or half round bearings.

From the above description it will be clearly apparent that I have provided a means of forming bearings in which neither die casting, centrifugal casting or pressure means are used, and that my method is positively free from the danger of oxidation, said danger being doubly guarded against by providing the non-oxidizing atmosphere and also performing the operations practically simultaneously.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. In a continuous method of manufacturing bearings, the process of moving a strip of bearing backing metal through a heating chamber having a metallurgical non-oxidizing atmosphere, pouring an excess of molten bearing metal on said strip while in said heating chamber, permitting a portion of said bearing metal to flow in a forward direction on said strip, slidably compacting said bearing metal on the surface of said strip, and then removing such composite strip from said heating chamber.

2. In a continuous method of manufacturing bearings, the process of moving a strip of bearing backing metal through a heating chamber having a metallurgical non-oxidizing atmosphere, pouring a layer of molten tin upon said strip, slidably compacting said tin upon the surface of said strip, immediately pouring an excess of molten bearing metal on said strip, permitting a portion of said bearing metal to flow in a forward direction on said strip, slidably compacting said bearing metal on the surface of said strip, and then removing such composite strip from said heating chamber.

3. In a continuous method of manufacturing bearings, the process of moving a strip of bearing backing metal through a heating chamber having a metallurgical non-oxidizing atmosphere, pouring an excess of molten bearing metal on said strip while in said heating chamber, restricting the extent of the layer of said bearing metal on the surface of said strip, and then removing such composite strip from said heating chamber.

4. In a continuous method of manufacturing bearings, the process of moving a strip of bearing backing metal through a heating chamber having a metallurgical non-oxidizing atmosphere, pouring a layer of molten tin upon said strip, slidably compacting said tin upon the surface of said strip, immediately pouring an excess of molten bearing metal on said strip, restricting the extent of the layer of said bearing metal on the surface of said strip, and then removing such composite strip from said heating chamber.

JOHN V. O. PALM.